United States Patent [19]

Alles et al.

[11] Patent Number: 4,542,375

[45] Date of Patent: Sep. 17, 1985

[54] DEFORMABLE TOUCH SENSITIVE SURFACE

[75] Inventors: Harold G. Alles, Bridgewater; Peter S. Kubik, South Plainfield, both of N.J.

[73] Assignee: AT&T Bell Laboratories, Murray Hill, N.J.

[21] Appl. No.: 347,877

[22] Filed: Feb. 11, 1982

[51] Int. Cl.⁴ .............................................. G09G 1/00
[52] U.S. Cl. ................................ 340/712; 340/365 P; 340/365 VL; 340/813.31; 340/815.31
[58] Field of Search ................... 340/712, 365 P, 709, 340/815.31, 365 VL

[56] References Cited

U.S. PATENT DOCUMENTS

| | | | |
|---|---|---|---|
| 2,227,083 | 12/1940 | Handrick | 178/18 |
| 3,271,515 | 9/1965 | Harper. | |
| 3,526,775 | 9/1970 | Friedrich et al. | 250/221 |
| 3,621,268 | 11/1971 | Friedrich et al. | 250/221 |
| 3,673,327 | 1/1972 | Johnson et al. | 340/712 |
| 3,707,715 | 12/1972 | Perotto | 340/365 P |
| 3,764,813 | 10/1973 | Clement et al. | 250/221 |
| 3,775,560 | 11/1973 | Ebeling et al. | 178/18 |
| 3,846,826 | 11/1974 | Mueller | 358/81 |
| 4,177,354 | 12/1979 | Mathews | 178/18 |
| 4,180,702 | 12/1979 | Sick et al. | 250/227 |
| 4,198,623 | 4/1980 | Misek et al. | 340/365 P |
| 4,305,071 | 12/1981 | Bell et al. | 340/712 |

FOREIGN PATENT DOCUMENTS 2485804 12/1981 France.

*Primary Examiner*—Marshall M. Curtis
*Attorney, Agent, or Firm*—David H. Tannenbaum

[57] ABSTRACT

A touch sensitive device is arranged with substantially parallel surfaces inside which light from a synchronized source, such as a CRT, can become trapped by total internal reflection. The screen is fitted with photodetectors which respond to the entrapment of light within the surfaces. The device is compliant so that a touch of the device at a particular point will cause an inward deflection of the surface at that point. The deflection causes light to become entrapped within the surface by total internal reflection thus making it possible, by comparing the photodetector output with the CRT raster position, to determine the exact surface position of the touch.

23 Claims, 8 Drawing Figures

DEFORMABLE TOUCH SENSITIVE SURFACE

TECHNICAL FIELD

This invention relates to a device for determining the position of a surface contact and more particularly to a touch sensitive device for use with a synchronized light source, such as a cathode ray tube (CRT).

BACKGROUND OF THE INVENTION

There are many applications where it is desired to provide feedback information for information displayed on a CRT screen. For example, it has become common practice with the use of computers to display on the screen a choice for the user to select from. The user is typically instructed to operate specific keys, on a keyboard or similar device, to select from among a menu of possible choices. In response to the user operating the selected key the menu is changed and the user is given a new choice, again making the choice by operating a particular key. Such an arrangement is tedious since a user must first look at the screen and then go to a separate keyboard to find the proper key. This is time consuming and requires costly separate equipment.

One possible solution to the problem has been to arrange the menu of choices along a side of the viewing screen and to arrange next to the screen a series of buttons. As the labels on the screen change the buttons become dynamically relabeled. While this solves some of the problems, it does not allow the complete flexibility of the visual display and still requires an artificial arrangement of the display.

Several attempts have been made to solve the problem, one such being the use of a light pen which is held over the point on the CRT screen corresponding to the desired response. Light from the CRT raster then enters the pen and the position of the raster is determined by comparing the signal output from the pen to the position of the raster beam at the time of the signal. This arrangement, while performing properly, has the disadvantage of requiring the user to hold a pen and to properly direct the pen to the proper place on the screen.

Other touch sensitive screens used cross wires, crossed beams of infrared light, reflection of acoustic surface waves, current division in resistive sheets, force balancing, or mechanical buttons on which a display image was superimposed by a half silvered mirror. When used with a CRT display, the foregoing methods require careful calibration to establish correspondence between points on the touch screen and points on the display. The need for special transducers or many electrical connections increase complexity and cost.

An exciting advance in the art is disclosed in two copending priorly filed applications, one in the name of L. R. Kasday (Ser. No. 333,744) filed Dec. 23, 1981, which is a continuation of application Ser. No. 140,715, filed Apr. 16, 1980, and one in the name of J. B. Mallos (Ser. No. 140,716) filed Apr. 16, 1980, now U.S. Pat. No. 4,346,376, dated Aug. 24, 1982. The Mallos application discloses a solid device into which signals are injected by total internal reflections. The Kasday application discloses a similar device where a flexible overlay is said to enhance the injection of signals into the device. Kasday also discloses the injection of the signals directly into the overlay. While both of these arragements operate properly, it is desired to arrange the device to both increase the amount of light (signal) energy which reaches the edges of the device and to provide a tactible sense of touch for the user. The problem with light signal strength is that common soda lime glass (as opposed to a high transmission glass) is a poor signal conductor in the longitudinal direction. Thus, signals which are introduced by total internal reflection must travel through the glass medium before arriving at a detector and thus are attenuated significantly thereby requiring sophisticated detector electronics to process the output signal.

SUMMARY OF THE INVENTION

Advantage is taken of the aforementioned Mallos disclosure where the CRT raster is a synchronized signal, the position of which is known at any point in time. Mallos has overlaid the CRT screen with a device having parallel surfaces, such as a glass plate, through which light generated by the raster is visible to the user. We have substituted the hard surface of Mallos with a compliant surface, the outer layer of which deforms when pressed. The air gap between the inner surface of the flexible device and the face of the CRT screen is maintained by, for example, a mesh insert. The edges of the compliant device are fitted with photodiodes which respond to the entrapment of light between the surfaces to provide an output. The compliant device is soft enough to allow its top surface to be deformed where depressed causing the light from the CRT screen surface to become entrapped within the device by total internal reflection because of a change in the angle of the light rays due to a change in the inner geometry of the top surface. This trapped light then travels to the sides of the device where the photodiodes detect the entrapment. By comparing the time of the changed photodiode output with the CRT raster position the exact surface position of the touch is determinable.

BRIEF DESCRIPTION OF THE DRAWING

These features and objects of our invention as well as others will be more fully appreciated from a review of the drawing in which.

DETAILED DESCRIPTION

Figure 1:
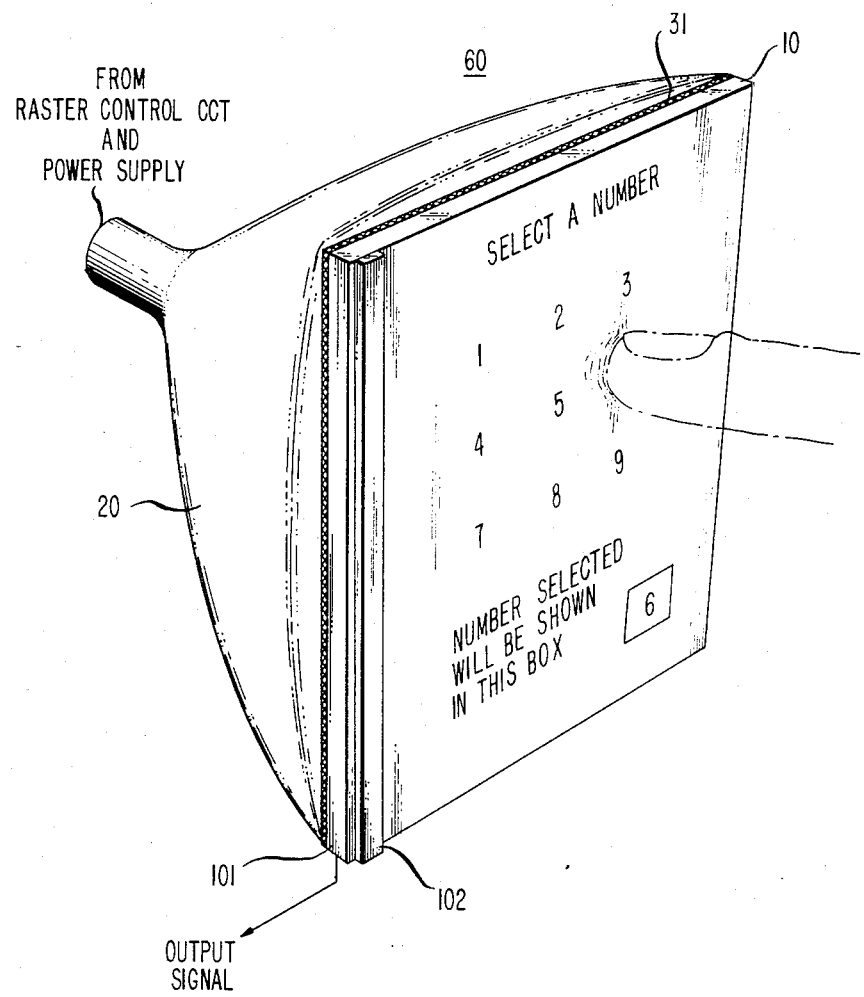
FIG. 1 shows a pictorial view of a CRT screen overlaid by our device.

As shown in FIG. 1, CRT 20 is arranged in the well known manner such that electrons from the electron gun (not shown) impinge upon the phosphorescent screen of the CRT in a sequential pattern, line by line, from top to bottom. As the electrons hit the phosphorescent surface, the surface glows giving off light energy. Phosphorescent images can be formed on the screen under control of the electron beam. This phenomenon, of course, is now well known and forms the basis of television and other CRT systems.

By properly programming the system, it is possible to have any type of image displayed at any position on the screen for any length of time. Thus, it is possible to create images representative of numbers, sets of numbers, letters, or signals in any position on the screen. Using our device, it is possible to allow a user to touch any position on the screen and to determine electronically the position of the touch. In order to accomplish this, we have overlaid the CRT screen with a soft, or compliant, device 10 having substantially parallel surfaces through which light from the phosphorescent screen may pass.

When the CRT screen projects an image calling for user response, a finger or other device is placed against device 10 at the position selected (the number 6 in FIG. 1). When this occurs, as will be explained from that which will follow, the top or outer surface of device 10 deforms and light becomes trapped within device 10. This trapped light travels to the edge of the device and is detected by photodiodes 101 thereby providing an output signal useable for determining the position of the touch. The actual determination of the touch position is accomplished by comparing the position of the CRT raster to the time of the output signal. This comparison and determination is the subject of U.S. Pat. No. 4,305,071 of S. W. Bell, R. L. Breeden and M. J. Sabin, dated Dec. 8, 1981, which patent is hereby incorporated by reference herein as though fully reproduced in this application. It should, of course, be noted that many types of signal detectors may be used, some not even physically connected to device 10, to determine whether or not light has been trapped.

Figure 2:
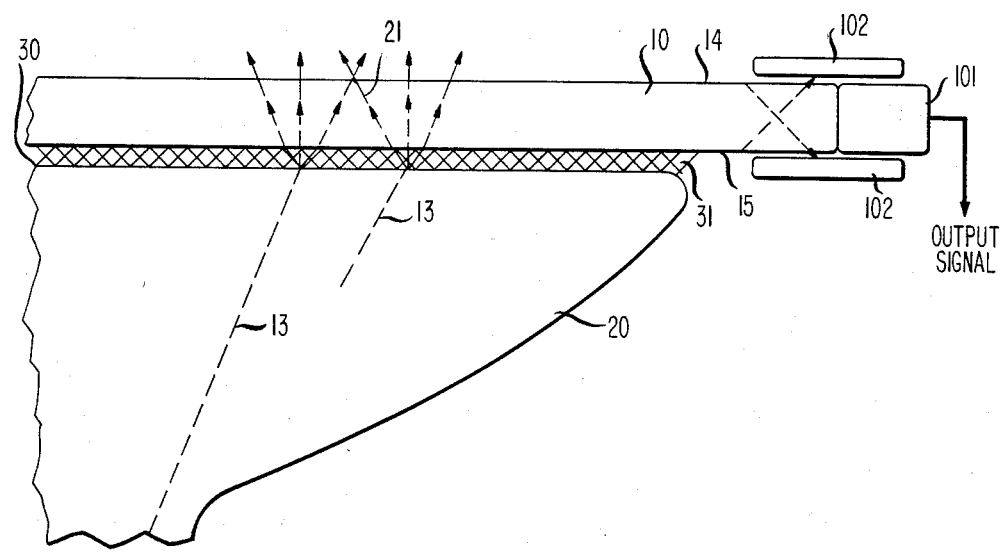
FIG. 2 is a schematic representation showing the device in the overlay, the overlay being in the untouched condition.

Turning to FIG. 2, CRI raster beam 13 is shown impinging on the front surface of CRT 20 with light rays 21 from the phosphorescent surface passing through air gap 30, and mesh 31 and into the parallel surfaces 14 and 15 of device 10 and out into air. Most of the light rays are transmitted outward toward the user. Since the index of refraction of material 10 is greater than the air on either side, some of the light rays are reflected back each time the light rays reach a surface boundary. However, most of the rays are traveling in a direction nearly perpendicular to the surface so that it takes many reflections for the rays to reach the detectors 101 and most of the reflected light is lost.

In general, some light will reach the detectors, depending on surface impurities that may scatter the light. Thus, the output signal from photodiode 101 measures internally scattered light and has a value which, while constantly changing, is known for any instant in time.

Air gap 30 is maintained by mesh 31 which advantageously can be woven from very thin nylon thread or twine.

Figure 3:
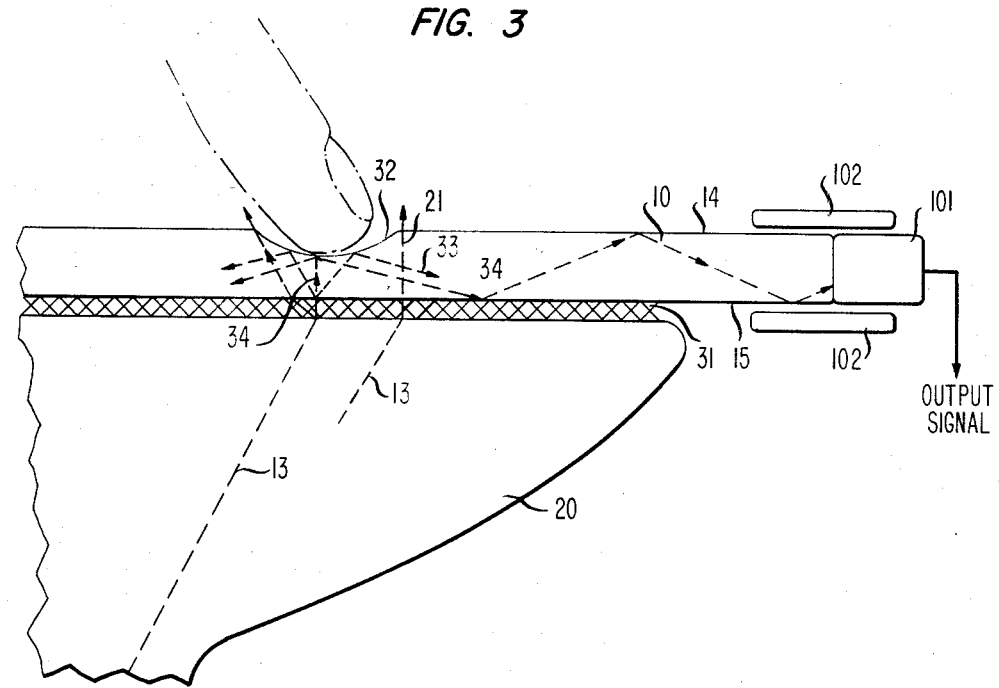
FIG. 3 shows my device with the finger in contact with the top surface.

In FIG. 3, a finger is shown touching upper surface 14 of device 10. This touch, as shown, causes a deformation in the upper surface, which changes the geometry of the inner structure of device 10 by creating an inwardly curving surface 32. This curving surface then serves to change the light ray angle of light which is injected into the device from the CRT. The light rays, such as light rays 33, are reflected back toward the CRT while light ray 21 continues through surface 14 into air. Light ray 34 is shown undergoing a scattering process, characterized by the angle at which the light ray leaves the surface being not equal to the angle of incidence. The light rays which are subject to reflection (as opposed to scattering) are much stronger and less loss is associated with the injection of light within medium 10 by this mechanism. Since, mesh 31 is positioned between the CRT and the lower surface of the device, contact between device 10 and the CRT is avoided, the air gap is maintained and thus the reflected light rays tend not to re-enter the CRT.

Because of the fact that the rays such as ray 33 have been reflected with an angle of reflection greater than the critical angle (as will be discussed), they remain trapped within the surfaces of device 10, and thus impinge upon the photodiodes 101 giving an output signal which is greater than the ambient scattered light signal.

If the compliant material is primarily homogenious and does not contain the impurities of glass, the light rays may travel easier through the material and thus provide a much higher signal-to-noise ratio than could otherwise be provided with the glass sheet of the Mallos application. Advantageously, the compliant material of device 10 will have an SA of around 20. The product called Sylgard by Dow Corning is one such material. This material will typically be between ¼- and ⅛-inch thick and will support a 1/32-inch deformation and have an index of refraction of around 1.5.

The trapped light signals then travel, as shown, within device 10 and impinges upon photodiode 101. Note that light absorbers 102 are ineffective to absorb trapped light since the light rays do not pass through surfaces 14 and 15. However, they do prevent external light (room light) from reaching the photodetectors. The light rays which impinge upon photodiode 101 cause an output signal which is different from the output signal generated when light does not impinge upon the photodiode. It is important to note that photodiode 101 may be any type of device for converting optical or other signals to electrical energy and may be a single device or may comprise a number of individual devices. In some applications a detector at one edge would be sufficient while in other applications it would be advantageous to surround device 10 on all sides with such a transducer which, of course, may have a single output or multiple outputs. In some applications, the transducer may communicate with the edge of device 10 through a suitable light conduit, and thus may be physically located at any convenient location or it may be adapted to detect light from the surface of the device.

In order to even out the detector response, the edges of the device, between the parallel surfaces can be coated white, or they may be polished and silvered.

Though in this embodiment arrows have been shown on light rays to indicate a particular direction of propagation, light paths are always reversible, and thus a dual of the device described here can be constructed by replacing the scanned display screen with a scanned photodetector array.

The touch position sensitive device described can detect force since the depression (and consequently the amount of trapped light) will increase as the force increases. Also, as the force increases, the bottom of the depression moves closer to the light source thereby also increasing the amount of light energy trapped.

If this device is used with a cathode ray tube very careful electrical shielding will be essential to prevent interference with detector response. In particular, interposing a ground plane between the CRT and the photodetectors is very helpful. Also, CRTs having phosphors with very fast initial decays will work best. Also, because photodiodes work well in the infrared region, the CRT phosphor can be doped to produce higher infrared light which also serves to enhance the light transmission through a glass device.

Total Internal Reflection Criteria

Figure 4:
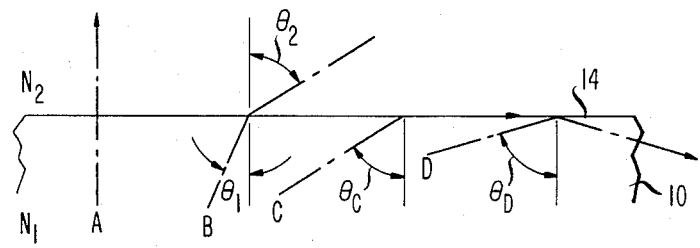
FIGS. 4 and 5 show the principles on which our invention is based.

Refraction at a single surface between media of refraction index $N_1$ and $N_2$ is shown in FIG. 4. Light ray A is perpendicular to the boundary and does not undergo refraction. Light ray B strikes the boundary with an angle $\phi_1$ and is refracted according to Snell's law which states $$N_1 \sin \phi_1 = N_2 \sin \phi_2 \qquad (1)$$

Light ray C approaches the boundary with angle $\phi_C$ which is the critical angle for total internal reflection. This critical angle, when $N_2 = 1$, which is the case for air, is shown by the formula $$\sin \phi_C = N_2/N_1 = 1/N_1 \text{ when } N_2 = 1 \text{ (air,} \qquad (2)$$

Light ray D approaches the boundary with an angle $\phi_D$ greater than the critical angle and thus is reflected backward.

Figure 5:
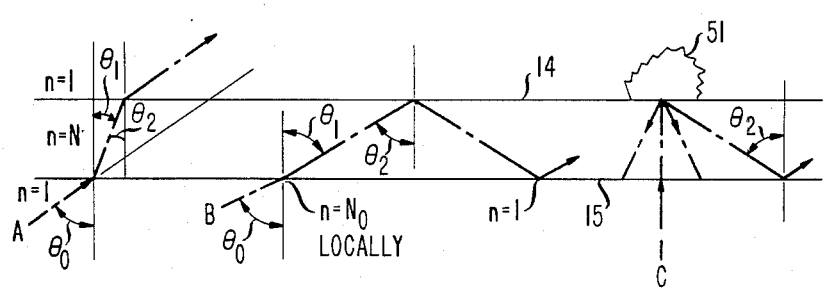

Turning now to FIG. 5, the conditions for total internal reflection (TIF) will be reviewed with respect to a device of refractive index N with air (refractive index = 1) at the surfaces of the device. When light ray A enters device 10 from air, total internal refraction cannot take place because the index of refraction at the lower surface bends the light ray to an angle smaller than the critical angle necessary for total internal refraction which is $\sin^{-1} 1/N$. This follows from use of geometry and Snell's law since $$\sin \phi_2 = \sin \phi_1 = \sin \phi_o/N, \qquad (3)$$

and $\sin \phi$ is less than 1 for all $\phi$.

In the case of light ray B (FIG. 5) the air space is eliminated when the light ray is assumed to enter from a medium with an index of refraction $N_o > 1$ which occurs when another body is in contact with the bottom surface of device 10. Total internal reflection can now take place (where air borders the device) because the light ray is no longer bent to an angle smaller than the critical angle at the lower surface. This follows from the fact that $$\sin \phi_2 = \sin \phi_1 = (N_o/N) \sin \phi_o \qquad (4)$$

which is greater than the critical angle $\sin^{-1} 1/N$ when $$N_o \sin \phi_o > 1. \qquad (5)$$

When the air space is eliminated on the top surface of device 10 as shown by light ray C hitting diffusely reflection medium 51 light enters the device from diffuse reflection at top surface 14. The value of $\phi_2$ is around 42° based on an assumed index of refraction of approximately 1.5. In this case, there is no refraction to bend the light ray below the critical angle, so total internal reflection can occur. This is the structure that forms the basis of the aforementioned Mallos application.

Figure 7:
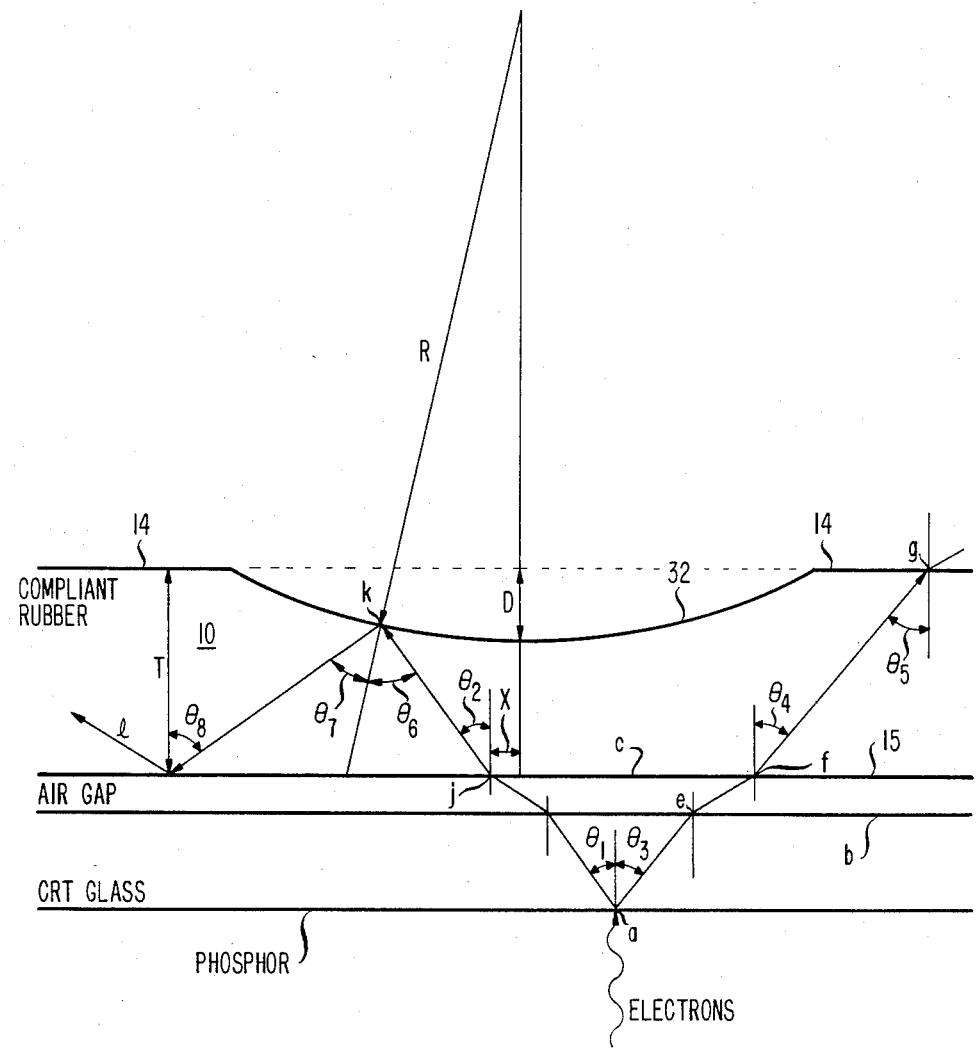
FIGS. 7 and 8 show an expanded schematic representation demonstrating the geometry for one embodiment.

In FIG. 7 electrons from the CRT gun strike the phosphor at point a and a cone of light is emitted. Most of those light rays strike surface b with an angle $\phi_1$ less than the critical angle (for total internal reflection) and will pass through surface 6, through the air gap, and enter the clear compliant rubber. Since the index of refraction of the rubber and the CRT glass is about the same, the angle $\phi_2$ of the light ray in the rubber is about the same as $\phi_1$. Some light is reflected at surface b and at surface c, but most of the light enters the rubber. Consider the light ray a, e, f, g where $\phi_3 \approx \phi_4 \approx \phi_5$. Since $\phi_3$ is less than the critical angle, $\phi_5$ is also less than the critical angle, and there can be no total internal reflection at g, and the light is not trapped in medium 14.

Now consider the light ray a, j, k, l that strikes the spherical depression at k. The surface is deformed so that $\phi_6$ is greater than $\phi_2$ so that total internal reflection can happen at k. If $\phi_6$ is greater than the critical angle, then $\phi_8$ must also be greater than the critical angle and the reflected light is trapped in the rubber.

As the electron beam is raster scanned, there are many positions a that will cause some light to be trapped in the rubber. The task is to relate $\phi_6$ to R, D, T, X, and $\phi_2$, and show what fraction of the light is trapped as a function of D. More specifically, $\phi_2$ will always be less than the critical angle, and $\phi_6$ must be greater than the critical angle for a substantial amount of the light to be trapped in medium 14 by total internal reflection.

There is a less restrictive case where $\phi_8$ is greater than the critical angle, but $\phi_6$ is less. Some light is reflected at k and is trapped, but most passes through the surface and is lost. This path makes a substantial contribution to the total amount of trapped light, but is sensitive to the surface conditions at k. Only the case for $\phi_6$ greater than the critical angle will be considered.

Figure 8:
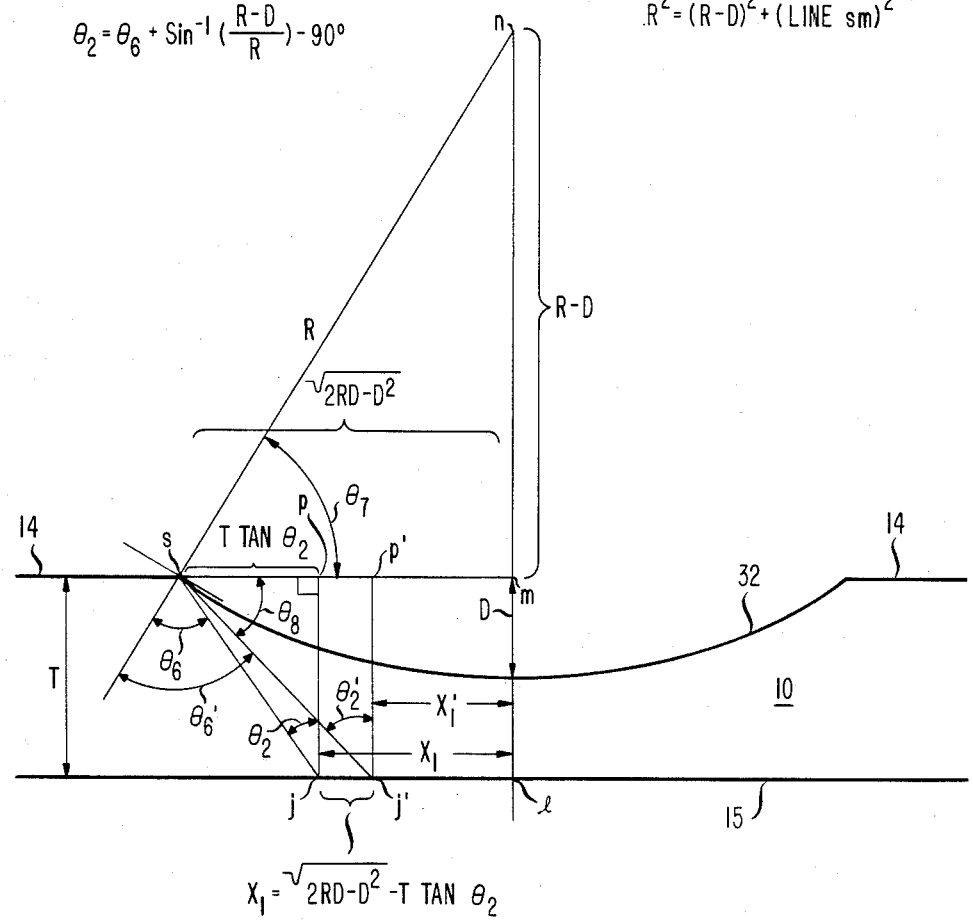

FIG. 8 illustrates the specific case where the point s is at the intersection of the flat surface and the spherical depression. This point is chosen here for its mathematical simplicity, and in practice does not occur since the rubber has a rounded rather than sharp edge at that point. Any other case could be demonstrated, but would require more tedious math.

The two interesting bounding conditions (FIG. 8) are $X_1$ when $\phi_6 = \phi_{CRIT}$ and $X_1'$ when $\phi_2 = \phi_{CRIT}$. When a cone of light rays enter medium 14 between points j and j', then some fraction of the light will be trapped.

$X_1'$ is bounded by the fact that $\phi_2' \leq \phi_{CRIT}$ so that if j' were moved right, then no light ray in the cone could reach the point s. $X_1$ is bounded by the fact that $\phi_6 \geq \phi_{CRIT}$ so that if j were moved to the left, then no light ray in the cone could reach s with $\phi_6$ large enough to cause total internal reflection. For the point s, the difference between j and j' is maximum, and the largest area under the depression can produce light that will be trapped. As the point s is moved toward the center of the depression, the difference between j and j' becomes vanishingly small. The total amount of trapped light could be calculated using a double integral where an area of cones of light rays are placed under the depression, and the rays from each cone striking the depression are examined for total internal reflection, and then integrating those rays that are totally reflected. A numerical solution is most proper here since the geometry is complex.

The bounding values will be calculated here for typical materials and dimensions. This calculation is meant to show only that total internal reflection conditions can be achieved practically, and is not meant to be a quantitative calculation of the amount of trapped light.

Using elementary trigonometry, the following relations can be derived:

$$\phi_7 = \sin^{-1}\left(\frac{R-D}{R}\right) \quad (6)$$

$$\phi_8 + \phi_2 = 90° \quad (7)$$

$$\phi_6 + \phi_7 + \phi_8 = 180° \quad (8)$$

$$\text{line } kp = T \tan \phi_2 \quad (9)$$

$$\text{line } km = \sqrt{2RD - D^2} \quad (10)$$

$$X_1 = \sqrt{2RD - D^2} - T \tan\phi_2 \quad (11)$$

$$X_{1'} = \sqrt{2RD - D^2} - T \tan\phi_{2'} \quad (12)$$

Using
$T = \frac{1}{8}" = 0.125$
$R = \frac{3}{8}" = 0.375$
$D = 1/32 = 0.031$ and
$\phi_{crit} = 42°$
(index of refraction $\approx 1.5$).
For the case when $\phi_6 \geq \phi_{crit}$ $$\phi_2 = \phi_6 + \sin^{-1}\left(\frac{R-D}{R}\right) - 90° \quad (13)$$
$$= 42° + 66.5° - 90° = 18.5°$$

$$X_1 = \sqrt{2RD - D^2} - T \tan 18.5° \quad (14)$$
$$= .15 - .04 = .11$$

For the case $\phi_2 \leq \phi_{crit}$ $$X_{1'} = \sqrt{2RD - D^2} - T \tan 42° \quad (15)$$

$$X_{1'} = .15 - .11 = .04 \quad (16)$$

Thus, for the typical values chosen, when the cone of light is between 0.04" and 0.11" from the point 1 (el), a fraction of the light will strike the point s and be trapped by total internal reflection. Of course, some light from these same cones will strike other points and also be trapped by total internal reflection. We have demonstrated here that the surface can be deformed enough to cause entrapment.

Thus, light can become trapped within device 10 by a geometry change of the surface of the device whether or not the medium bounding that surface is changed. It should be noted also that if the lower surface of device 10 were not open to air, the reflected light rays would leave the lower surface (possibly going back into the CRT) and would not become trapped until angle $\phi_3$ reaches some very high level. Also, it should be noted that as the depression deepens (increased force) more light is trapped because of the increased area under the depression that can satisfy the total internal reflection condition.

Figure 6:
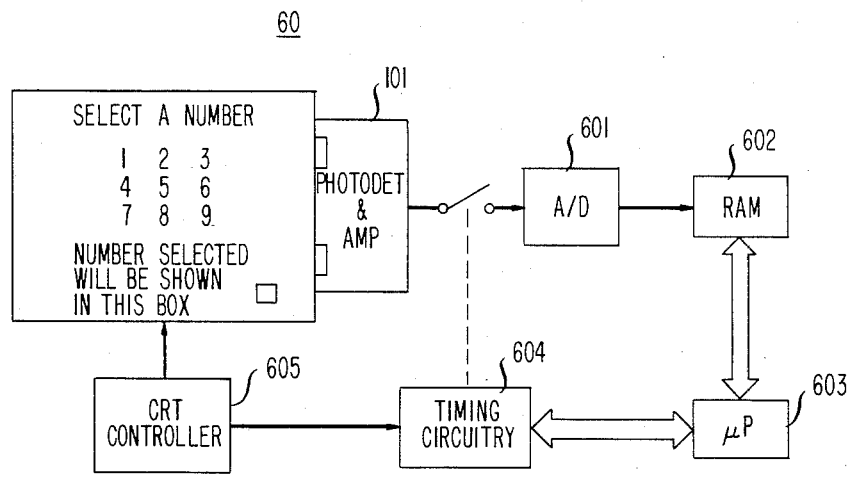
FIG. 6 shows a block diagram of an operational system.

FIG. 6 shows a typical system application as more fully detailed in the patent of Bell-Breeden-Sabin.

CONCLUSION

It is understood that the signals may be optical, acoustical or may be electronic so long as they obey the physical phenomenon described. It, of course, is to be understood that those skilled in the art may find many applications and modifications using my invention and it may be built as a separate device for mating with an existing CRT or it may be manufactured as a part of the CRT implosion shield itself. Also, it should be noted that because the amount of deformation of the top surface is a function of the pressure applied, and since the larger the deformation, the greater will be the amount of light trapped, it is possible to construct a device which uses the applied force, to select, for example, colors or hues, in a graphical environment.

What is claimed is:

1. A touch sensitive device for use in conjunction with a signal source, said device comprising spaced apart surfaces arranged such that signals are introduced between said surfaces so as to become entrapped within said device by total internal reflection between said surfaces as a result of a deformation of one of said surfaces of said device relative to the other of said surfaces, and signal utilization means adapted to provide a distinctive output when said signals are so introduced between said surfaces.

2. The invention set forth in claim 1 wherein a portion of said signals pass through said surfaces.

3. The invention set forth in claim 1 wherein said surfaces are substantially parallel to each other prior to said touch and wherein the inner side of said deformed surface forms a convex surface with respect to said signals.

4. The invention set forth in claim 1 further comprising means for coordinating the position of said signal across said surfaces of said device with said distinctive output to determine the exact position on said surface of said touch.

5. The invention set forth in claim 1 wherein said signal source is a CRT and wherein said signals which are introduced into said device are light signals from said CRT and wherein means are positioned between said device and CRT to insure the presence of an air gap even when said surface is touched.

6. The invention set forth in claim 2 wherein said light utilization means includes at least one light detecting diode.

7. The invention set forth in claim 2 wherein said light utilization means includes optic fibers.

8. Deflection detection apparatus for use with a signal source, said apparatus comprising a compliant structure having spaced apart surfaces such that signals from said signal source are introduced by total internal reflection between said surfaces as a result of a compression of said structure.

9. Deflection detection apparatus comprising, in combination, a signal source, and a compliant structure having spaced apart surfaces such that signals from said signal source are introduced by total internal reflection between said surfaces, as a result of a compression of said structure.

10. A position sensitive total internally reflective device for use in conjunction with a source of light, said device comprising substantially parallel surfaces arranged such that light from said light source impinging upon one of said surfaces is subject to a changeable light ray angle within said surfaces due to an inward deformation of said one surface, and light utilization means arranged to provide a distinctive output only when said impinging light is subjected to said changed light ray angle so as to become entrapped within said device by total internal reflection between said surfaces of said device.

11. The invention set forth in claim 10 further comprising
means for coordinating the position of said light across said surfaces of said device with said distinctive output to determine the exact position on said one surface of said touch.

12. The invention set forth in claim 10 wherein said utilization means includes at least one light detecting diode.

13. The invention set forth in claim 10 wherein said detecting diode is mounted adjacent an edge of said parallel surfaces and where said edge is coated white.

14. The invention set forth in claim 10 wherein said device is a deformable material at least ⅛ inch thick having the property that one surface may be deformed inward while the opposite surface remains relatively undeflected.

15. A touch position sensitive total internally reflective device adapted for mating with the screen of a CRT operable for generating light patterns on the surface thereof, said light patterns being coordinately positioned under control of repetitive vertical and horizontal inputs, said device comprising
a flexible sheet of transparent material having inner and outer surfaces substantially parallel to each other through which light from said mated CRT screen passes,
at least one light utilization means operable for providing outputs indicative of the magnitude of the light impinging on said utilization means and positioned so that light which impinges thereupon comes substantially from within said device between said parallel surfaces, and so that when said outer surface of said device is flexed inward at a point thereon said utilization means output reflects such deflection for a period of time corresponding to the time when said light is being generated at said point of flexure.

16. The invention set forth in claim 15 wherein said device is a flexible material at least ⅛ inch thick having the property that one surface may be deflected inward while the opposite surface remains relatively undeflected.

17. A device for use in combination with the screen of a CRT, said CRT operable for generating light images on the screen thereof, said light images occurring as a result of a horizontal and vertical scan of an electron beam directed against said screen, said device including
a sheet of material having inner and outer surfaces through which light generated at said CRT screen will pass with a refraction angle $\phi 1$ at said inner surface next to said CRT screen and with a refraction angle $\phi 2$ at said outer surface,
light utilization means operable for providing an output representative of the magnitude of light which impinges on said light utilization means, and
positioned such that said impinging light comes substantially from between said surfaces of said device and such that when said refraction angle $\phi 2$ is changed to refraction angle $\phi 3$ said light utilization means output reflects said angle change, said refraction angle $\phi 3$ being such that total internal reflection occurs, said refraction angle $\phi 3$ being a result of an inward flexure of said outer surface of said device.

18. The invention set forth in claim 17 wherein said photodetecting means includes first and second photodiodes having different spectral sensitivities.

19. The invention set forth in claim 17 further comprising means positioned between said CRT and said device for maintaining an air gap between said inner surface and said CRT even when said outer surface is flexed.

20. A CRT having a touch position sensitive total internally reflective screen, said screen comprising
substantially parallel outer and inner surfaces arranged such that signals are introduced between said surfaces as a result of a flexure of said outer surface relative to said inner surface of said screen, and,
signal communicating means arranged to provide a distinctive output when said signals are introduced between said surfaces by a touch of said outer-surface so as to become entrapped within said screen by total internal reflection of said surfaces of said screen.

21. The invention set forth in claim 20 further comprising
means for coordinating the ordinate position of said signal across said screen with said distinctive output to determine said position on said screen of said touch.

22. A CRT operable for generating light images on the screen thereof, said light images occurring as a result of a horizontal and vertical scan of an electron beam directed against said screen, said CRT including
a screen having inner and outer parallel surfaces through which light generated by said electron beam will pass with a refraction angle $\phi 1$ at said inner surface and with a refraction angle $\phi 2$ at said outer surface,
light utilization means arranged for providing an output representative of the magnitude of light which impinges on said utilization means, and positioned such that said impinging light comes substantially from between said surfaces of said screen and such that when said refraction angle $\phi 2$ is changed to a refraction angle $\phi 3$ said utilization means output reflects said angle change, said refraction angle $\phi 3$ being the critical angle for total internal reflection to occur, and said refraction angle $\phi 3$ being a result of a flexure of said outer surface of said screen relative to said inner surface.

23. A touch sensitive device for use in conjunction with a signal source, said device comprising
a layer bounded by two spaced apart surfaces arranged such that signals may be introduced between said surfaces, said layer having one of said surfaces deformable with respect to the other of said surfaces whereby signals introduced via one of said surfaces and having an angle $\phi 1$ with respect to said surfaces as a result of a deformation of the other of said surfaces relative to said one surface, said deformation changing the angle of said signal from $\phi 1$ to $\phi 2$ with respect to said other surface, and
means for detecting said entrapped signals and producing a signal in response thereto.

* * * * *